(No Model.)
G. HARRIOTT.
MUD GUARD FOR BICYCLES.
No. 458,806. Patented Sept. 1, 1891.
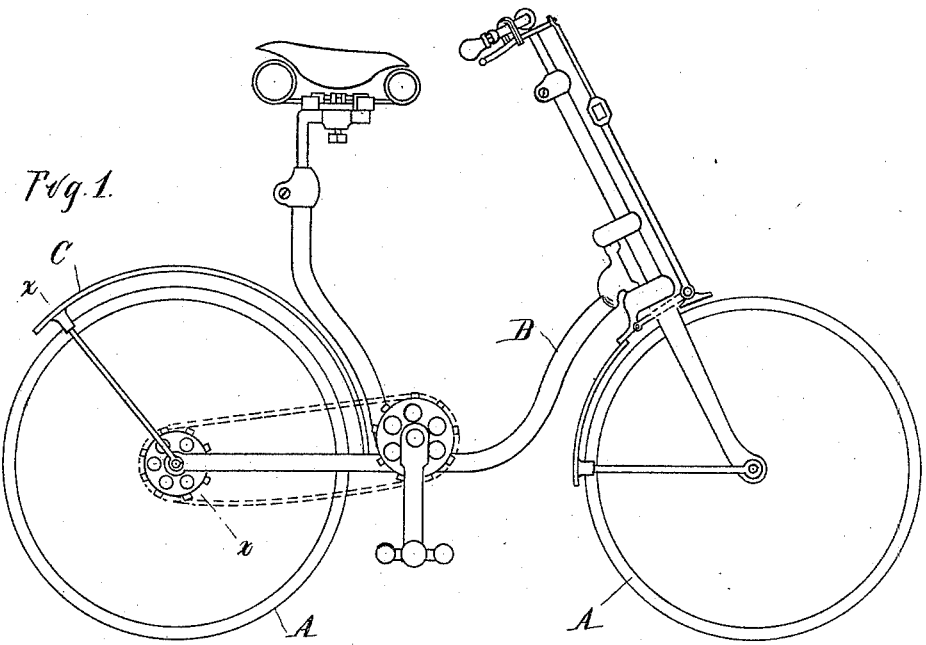
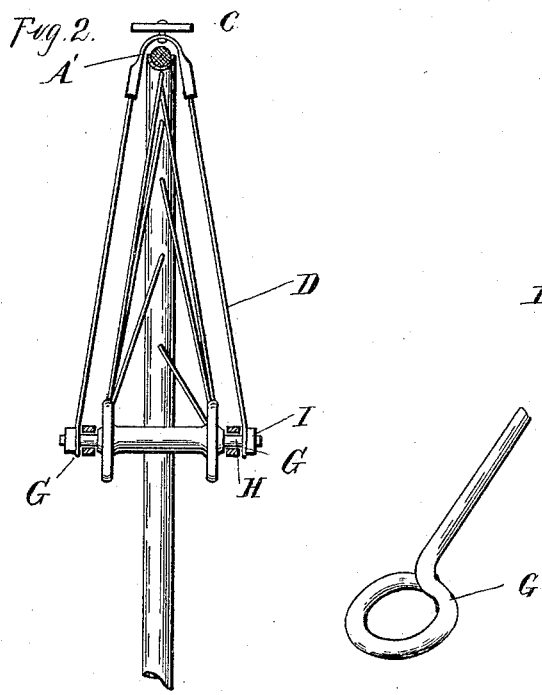
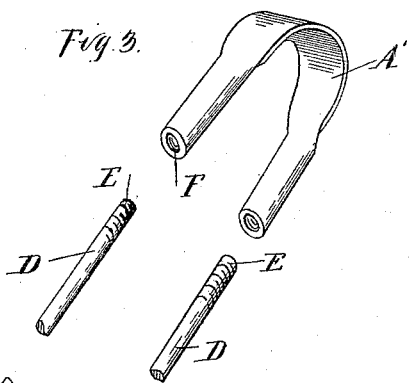
Witnesses
M. B. Dougherty
P. M. Hulbert
Inventor
George Harriott
By Ross Sprague & Son
Att'y.

United States Patent Office.

GEORGE HARRIOTT, OF TOLEDO, OHIO, ASSIGNOR TO THE GENDRON IRON WHEEL COMPANY, OF SAME PLACE.

MUD-GUARD FOR BICYCLES.

SPECIFICATION forming part of Letters Patent No. 458,806, dated September 1, 1891.

Application filed May 1, 1891. Serial No. 391,277. (No model.)

*To all whom it may concern:*

Be it known that I, GEORGE HARRIOTT, a subject of the Queen of Great Britain, residing in Toledo, in the county of Lucas and State of Ohio, have invented certain new and useful Improvements in Mud-Guards for Bicycles, of which the following is a specification, reference being had therein to the accompanying drawings.

This invention relates to new and useful improvements in mud-guards for bicycles; and the invention consists in the peculiar construction of the supporting-frame of the mud-guard, whereby it may be more perfectly adjusted to a level position than constructions heretofore devised and whereby the supporting-frame is locked in its adjusted position by the nuts which hold the wheel in position, all as more fully hereinafter described.

In the drawings, Figure 1 is a diagram elevation of a bicycle embodying my improvement. Fig. 2 is a section on X X through the hind wheel, showing the mud-guard supporting the frame in elevation; and Fig. 3 is a detached perspective view of this frame.

A are the wheels, and B is the frame of a bicycle of any known construction. C is the mud-guard or fender which encircles the top of the rear wheel. This mud-guard has generally been secured to the rear axle by means of standards on each side of the wheel, secured at one end to the mud-guard and at the other end to the rear axle or to the frame of the bicycle. This construction necessitated very careful workmanship in order to get the mud-guard at the proper height above the wheel and at the same time to perfectly level it.

My construction is for the purpose of overcoming these objections; and it consists in forming a yoke-shaped frame to support the mud-guard. This frame consists of a saddle portion A', which may be of malleable or wrought iron, as desired, of suitable shape and size to embrace the top of the wheel, and to which is secured in any suitable manner, such as by riveting, the mud-guard or fender C. This saddle is supported in position above the wheel by means of the two standards D, which have the screw-threaded portions E at their upper ends, adapted to engage in suitable interiorly-screw-threaded sockets F in the vertical portions of the saddle and the eyes G at the lower end thereof. These eyes are adapted to be secured upon the rear axle H, and are held in position thereon by means of the nuts I. It is evident, however, that they may be secured to the frame of the bicycle, if desired. Now, after the mud-guard and its supporting-frame are placed in position, if it should be found that the guard is not level, by adjusting one of the nuts I and eye G the standards D upon that side of the wheel may be detached and turned a suitable number of times to raise or lower that side of the mud-guard to bring it to its level position, and if it is found that the guard is too near the wheel both standards may be disengaged, suitably turned, and then by replacing the nuts I the device is complete, the parts being firmly secured in position without danger of displacement.

What I claim as my invention is—

1. The combination, with a bicycle and its mud-guard, of adjustable supporting-standards therefor, substantially as described.

2. The combination, with a bicycle, of a mud-guard and its supporting-standard consisting of the yoked-shaped saddle A, having the vertical sockets F, the standards D, adjustably engaging therewith, the eyes G, formed at the lower end thereof, and means for detachably engaging said standards to the bicycle, substantially as described.

3. In a bicycle, the combination of the rear wheel and axle of the mud-guard C, supported above said wheel by means of the saddle portion A', the standards D, adjustably engaging therewith, the eyes G, formed at the lower end thereof and engaging upon the rear axle, and the nuts I, stationarily securing said standards in position, substantially as described.

In testimony whereof I affix my signature in presence of two witnesses.

GEORGE HARRIOTT.

Witnesses:
W. T. CULBERSON,
P. N. MACKINDER.